US007752365B2

(12) United States Patent
Taylor et al.

(10) Patent No.: US 7,752,365 B2
(45) Date of Patent: Jul. 6, 2010

(54) BI-DIRECTIONAL SINGLE CONDUCTOR INTERRUPT LINE FOR COMMUNICATION BUS

(75) Inventors: John P. Taylor, San Diego, CA (US); Jeffrey M. Thoma, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 105 days.

(21) Appl. No.: 12/060,540

(22) Filed: Apr. 1, 2008

(65) Prior Publication Data

US 2009/0248932 A1 Oct. 1, 2009

(51) Int. Cl.
G06F 13/00 (2006.01)
(52) U.S. Cl. ...................................... 710/110; 710/105
(58) Field of Classification Search ................. 710/105, 710/106, 107, 110; 713/400, 600
See application file for complete search history.

(56) References Cited

U.S. PATENT DOCUMENTS

| | | | |
|---|---|---|---|
| 5,210,846 A | 5/1993 | Lee et al. | |
| 5,327,121 A | 7/1994 | Antles, II | |
| 5,506,965 A | 4/1996 | Naoe | |
| 6,535,018 B1 * | 3/2003 | Kost | 326/68 |
| 6,693,678 B1 * | 2/2004 | Tults et al. | 348/571 |
| 6,799,233 B1 * | 9/2004 | Deshpande et al. | 710/110 |
| 6,822,480 B1 * | 11/2004 | McCalmont | 326/81 |
| 6,842,806 B2 * | 1/2005 | Ervin | 710/110 |
| 6,922,790 B2 * | 7/2005 | Smith et al. | 713/600 |
| 6,944,695 B1 * | 9/2005 | Tangen | 710/107 |
| 7,071,677 B2 * | 7/2006 | Taylor | 324/111 |
| 7,143,215 B2 * | 11/2006 | Dunstan et al. | 710/104 |
| 7,181,557 B1 | 2/2007 | Falik et al. | |
| 2004/0151201 A1 * | 8/2004 | Dandy et al. | 370/451 |
| 2007/0220190 A1 * | 9/2007 | Hidai et al. | 710/110 |
| 2008/0074150 A1 * | 3/2008 | Crawford | 326/90 |

OTHER PUBLICATIONS

The I2C Bus and How to Use It (including Specifications), Philips Semiconductors, Apr. 1995.*

* cited by examiner

Primary Examiner—Khanh Dang

(57) ABSTRACT

A bi-directional single conductor interrupt line is used in conjunction with a master only initiated data communication bus, to allow a slave device to submit a slave service request to a master device and to acknowledge master service requests from the master device. When not submitting a master service request, the master device maintains an interrupt line voltage at an idle state voltage by setting the interrupt line voltage through a pull resistor. The slave and master devices submit service requests by respectively driving or pulling the interrupt line voltage from the idle voltage to the service request voltage. The slave responds to a master service request or initiates the master servicing of a slave service request by subsequently driving the interrupt line back to the idle state voltage giving a slower slave ample time to prepare for a pending master initiated data transaction. The master detects the change in the interrupt line voltage from the request to the idle state and communicates to the now readied slave device through the data communication bus.

34 Claims, 7 Drawing Sheets

BI-DIRECTIONAL SINGLE CONDUCTOR INTERRUPT LINE FOR COMMUNICATION BUS

CROSS-REFERENCE TO RELATED APPLICATION

This application is related to U.S. patent application entitled "Bi-Directional Level Shifted Interrupt Control", U.S. patent application Ser. No. 12/060,561, filed on Apr. 1, 2008 the contents of which are incorporated by reference herein.

FIELD

The invention relates in general to wireless communication systems and more specifically to managing communications between a master processor and a slave processor over a bi-directional two conductor bus.

BACKGROUND

Processors often exchange data over a bi-directional bus to communicate with other devices and other processors. Many bus protocols require the slave processor to respond to communications initiated by the master processor on the bus and do not provide for a mechanism for the slave processor to initiate a transaction. Accordingly, the slave processor can only participate in a transaction after being polled by a master processor. In many arrangements, a separate interrupt line is provided between the master processor and the slave processor to allow the slave to initiate a transaction with the master. Bus protocols typically include a signaling mechanism to alert other devices on the bus that a transmission will occur. As discussed in further detail below, for example, $I^2C$ bus protocols provide for a particular sequence of high and low levels on the two conductors of the $I^2C$ bus to form a START signal that indicates the beginning of a transmission.

For exchanging data through the bus, slave devices include a bus interface that can be implemented using hardware, firmware and/or software. Implementations using firmware and/or software (collectively referred to herein as "non-hardware implementations") are significantly less expensive than hardware bus interfaces. The non-hardware implementations, however, are limited in that the adequate resources to detect a start condition on the bus typically cannot be allocated for continuously monitoring the bus. Accordingly, transactions initiated by the master processor may go undetected by the slave processor. One possible implementation for avoiding this situation includes implementing a second interrupt line between the master and the slave to allow the master to signal the slave that a transaction will occur. Such implementations have the significant disadvantage of requiring an additional wire or connection between the master and slave.

Accordingly, there is a need for bi-directional single conductor interrupt line.

SUMMARY

A bi-directional single conductor interrupt line allows a slave device to submit a slave service request to a master device and to acknowledge master service requests from the master device. When no service requests are pending, the master device maintains an interrupt line voltage of the interrupt line at an idle state voltage by setting the interrupt line voltage through a pull resistor. The slave device submits a slave service request by driving the interrupt line voltage from the idle state voltage to a slave service request voltage and subsequently back to the idle state voltage. Accordingly, the slave device submits a slave service request by forcing the interrupt line voltage from the idle state voltage to the service request voltage and back to the idle state voltage. The master device detects the change in the interrupt line voltage from the request to the idle state and initiates a slave service transaction through the two conductor bus. Before the end of the slave service transaction, the slave releases the interrupt line and the master maintains the interrupt line at the idle state through a pull resistor. The master device submits a master service request by changing the interrupt line voltage from the idle state voltage to a service request voltage. The slave device detects the change in voltage and acknowledges the master service request by setting the interrupt line voltage to the idle state voltage.

DETAILED DESCRIPTION

Figure 1:
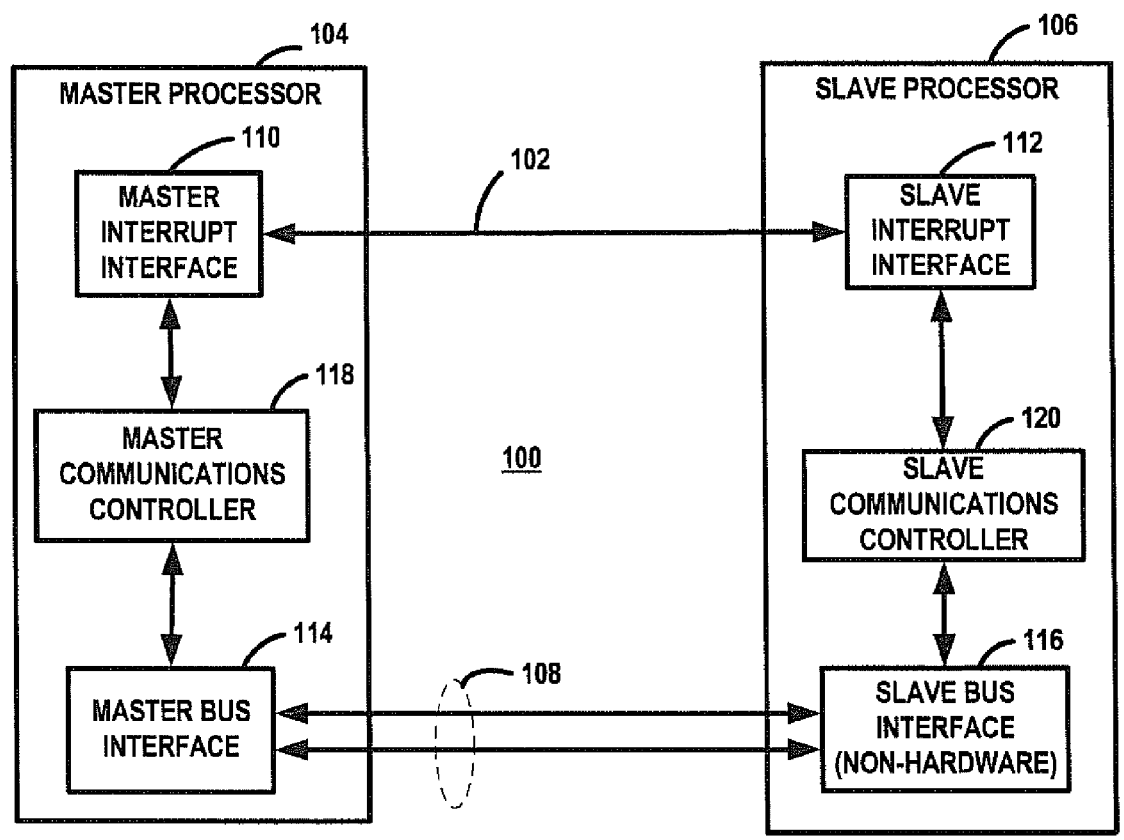
FIG. 1 is a block diagram of a communication bus system in accordance with an exemplary embodiment of the invention.

FIG. 1 is a block diagram of a two conductor bus system 100 with a single conductor interrupt line 102 in accordance with the exemplary embodiment of the invention. A master processor 104 communicates with a slave processor 106 through two conductor communication bus 108. The master processor 104 and slave processor 106 each include an interrupt interface 110, 112 for connecting to the interrupt line 102, a bus interface 114, 116 for connecting to the bi-directional two conductor communications bus (communications bus) 108 and a communications controller 118, 120 for managing communications through the communications bus 108 and the interrupt line 102. In the exemplary embodiment, the communication bus 108 is a two conductor bi-directional communication bus that operates in accordance with $I^2C$ protocol. The $I^2C$ bus, discussed in further detail below, consists of two active conductors and a ground connection (not shown). Each bus interface 114, 116 provides an interface for detecting and generating signals on the bus 108. In the exemplary embodiment, the slave bus interface 116 is implemented in firmware and or software and is, therefore, a non-hardware bus interface. Although the slave bus interface 116 may include some limited hardware components such as, for example, electrical connectors or conductors for connecting to the conductors of the bus 108 and physical packaging, at least most of the interface functionality is performed by software and/or firmware executed in the slave processor 106. Accordingly, the slave bus interface 116 includes limited, if any, logical gates or other processing hardware dedicated to interpreting and generating signals on the bus.

As described below in further detail, each of the interrupt line interfaces 110, 112 provides an interface for detecting and establishing voltage changes on the single conductor interrupt line 102. The interrupt interfaces 110, 112 convey voltage conditions on the interrupt line 102 to respective communications controllers 118, 120 and establish voltages on the interrupt line 102 in response to instructions from the respective communication controller 118, 120. Each communications controller 118, 120, therefore, manages communications on the interrupt line 102 and the communication bus 108 through the interrupt interface and bus interface, respectively.

As mentioned above, the I²C bus is a two conductor bus. The active conductors are bi-directional and include a serial data line (SDA) and a serial clock line (SCL). Depending on the functionality of a particular device connected to the bus 108, the device may act as a transmitter of and/or receiver. Prior to any transaction on the bus, a start condition must be issued on the bus to indicate to all devices connected on the bus that a transmission will occur. As a result, all connected devices listen to the bus after detecting the start condition. As discussed above, a device may not have the resources to detect the start condition where the bus interface is a non-hardware implementation. Since the I²C bus is a multi-master bus, more than one connected master device is capable of initiating a data transfer. No slave processors, however, can initiate transactions through the bus and must utilize the interrupt line to initiate transactions. Accordingly, the slave processor initiates and detects bus transactions using the interrupt line.

During operation, the master processor 104 maintains an interrupt line voltage of the interrupt line at an idle state voltage. Depending on the particular implementation, idle state voltage may be a high voltage such as voltage at or near Vdd or a may be a low voltage such as voltage at or near ground (zero volts). The service request voltage is the opposite logic polarity of the idle voltage. In the exemplary embodiment discussed below with reference to FIGS. 2-6, the idle voltage is a low voltage (near ground) and the service request voltage is a high voltage (near Vdd). As discussed herein, the service request voltage and the idle state voltage are voltages that are interpreted as a logic levels. Accordingly, the term "service request voltage" is a measurable physical voltage as well as a quality that is interpreted as a logic level that is above or below a threshold that is interpreted as a logic level that indicates the service request state. Also, the term "idle state voltage" is a measurable physical voltage as well as a quality that is interpreted as a logic level that is above or below a threshold that is interpreted as a logic level that indicates the idle state. Therefore, the idle state voltage and the service request voltage may each include more than a single value. An example of a suitable implementation of the master interrupt interface includes the use of one port of the mater processor and one or more pull resistors such that the bi-directional single conductor interrupt line may be pulled by the master to the idle or service request voltages. An example of a suitable implementation of the slave processor 106 includes a input/output port that may either drive the interrupt line low (near ground) or high (near Vdd) and thus override the voltage of the master, this being the slave "output" state or alternatively drive the interrupt line in neither direction and thus allow the master to set the interrupt line voltage, this being the slave "input" state.

The slave processor 106 requests a transaction on the bus 108 by toggling the interrupt line voltage from the idle state voltage to the service request voltage back to the idle state voltage. After the master detects the service request voltage to idle voltage transition, indicating a readiness of the slave, the master initiates a transaction on the bus 108. Before the end of the transaction on the bus 108, the slave releases the interrupt line and the master also maintains the interrupt line at the idle voltage through a pull resistor if no further service requests are pending. The master processor 104 initiates a transaction on the bus 108 by setting the interrupt line voltage to the service request voltage. After the slave processor detects the service request voltage on the interrupt line 102 and is prepared to receive signals on the bus 108, the slave processor 106 sets the interrupt line voltage back to the idle state voltage. The master processor 104 begins transmitting on the bus 108 after detecting that the interrupt line voltage has returned to the idle state voltage. Before the end of the transaction on the bus 108, the slave must release the interrupt line and the master must also maintain the interrupt line at the idle voltage through a pull resistor if no further service requests are pending.

In the exemplary embodiment, therefore, detection of the service request voltage occurs when the interrupt line voltage is detected to exceed a logic high threshold and a detection of the idle state voltage occurs when the interrupt line voltage is detected to have fallen below a logic low threshold. Other thresholds may be used in some circumstances.

The two conductor bus 108 transactions include information indicating whether data is to be passed from the master to the slave or from the slave to the master, where the direction of data flow being is set by the master device. If the slave processor 106 initiates a slave service request and the master processor 104 interrupts the request by initiating a master service request before the slave processor 106 has returned the interrupt line voltage to the idle state, the transition from the service request voltage to the idle state voltage is interpreted by the master processor as an acknowledgment by the slave processor 106 to the master service request. Since the master processor 104 sends information related to the master processor task, the slave processor 104 processes the master processor task and initiates another slave service request.

If the master processor initiates a master service request and the slave processor attempts a slave processor service request before acknowledging the master service request, the slave processor interprets a persistence of the interrupt line voltage at the service request voltage after the transaction is complete as the master waiting for service. During such a scenario, the master processor sets the interrupt line voltage to the service request voltage before the slave processor sets the interrupt line voltage to the service request voltage and the slave processor sets the interrupt line voltage to the idle state voltage before releasing the interrupt line 102. Since the slave processor detects the interrupt line voltage remaining at the service request message level, the slave processor acknowledges the master service request after slave service request is processed and the master processor data is exchanged on the bus.

The general voltage transmissions described above and further described below with reference to an implementation where the master service request voltage and the slave service request voltage are equal to a logic "high" voltage and the idle state voltage is equal to a logic "low". As mentioned above, other relative voltages may be used in other implementations.

Figure 2:
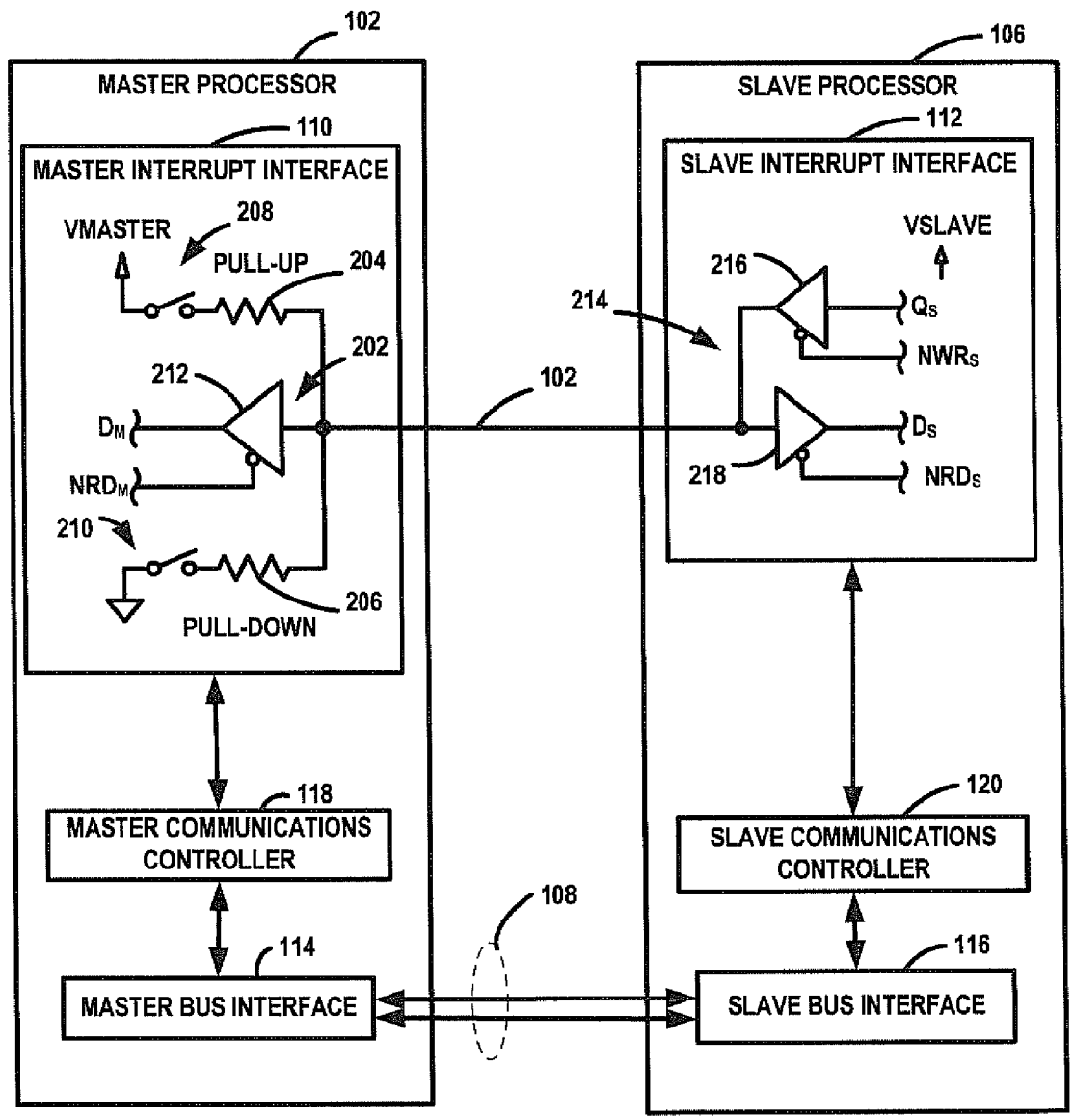
FIG. 2 is a block diagram of exemplary bus communication system where the master interrupt interface includes a single GPIO port with internal pull-up and pull-down resistors and the slave interrupt interface includes a GPIO port.

FIG. 2 is a block diagram of exemplary bus communication system 100 where the master interrupt interface 110 includes a single master GPIO port 202 with an internal pull-up resistor 204 and pull-down resistor 206 and the slave interrupt interface 112 includes a GPIO port 214 including a driver 216 and a buffer 218. The pull-up resistor 204 is connected to the interrupt line 102 through a pull-up switch 208 and the pull-down resistor 206 is connected to the interrupt line 102 through a pull-down switch 210. A buffer 212 of the GPIO port 202 is connected to the interrupt line 102 and detects the interrupt line voltage. The master communications controller 118 controls the switches 208, 210 and master GPIO port 202 to change and interpret the interrupt line voltage. The slave communications controller 120 controls GPIO port to change and interpret the interrupt line voltage. In a typical implementation, all these elements are contained within the master and slave micro-processors thus requiring no external circuitry. Some or all of the functions may be implemented externally from the processors. Fort example, some of the elements may be implemented in external devices because the functions are not available in the processors or for cost reasons. Further, employing external devices may more easily facilitate the implementation of additional functions or features, such as level shifting between micro-processors operating at different supply voltages. The interface 108 may likewise require external circuitry not shown to accommodate system requirements such as different operating voltages. An example of a suitable level shifting circuit is discussed in U.S. patent application Ser. No. 12/060,561, entitled "Bi-Directional Level Shifted Interrupt Control", filed on Apr. 1, 2008 and incorporated by reference in its entirety herein. The operation of the bus communication system of FIG. 2 is discussed below with reference to the FIGS. 3-6 showing timing diagrams for four situations. The slave service request voltage and the master service request voltage are logic high voltages for the examples of FIGS. 3-6.

Figure 3:
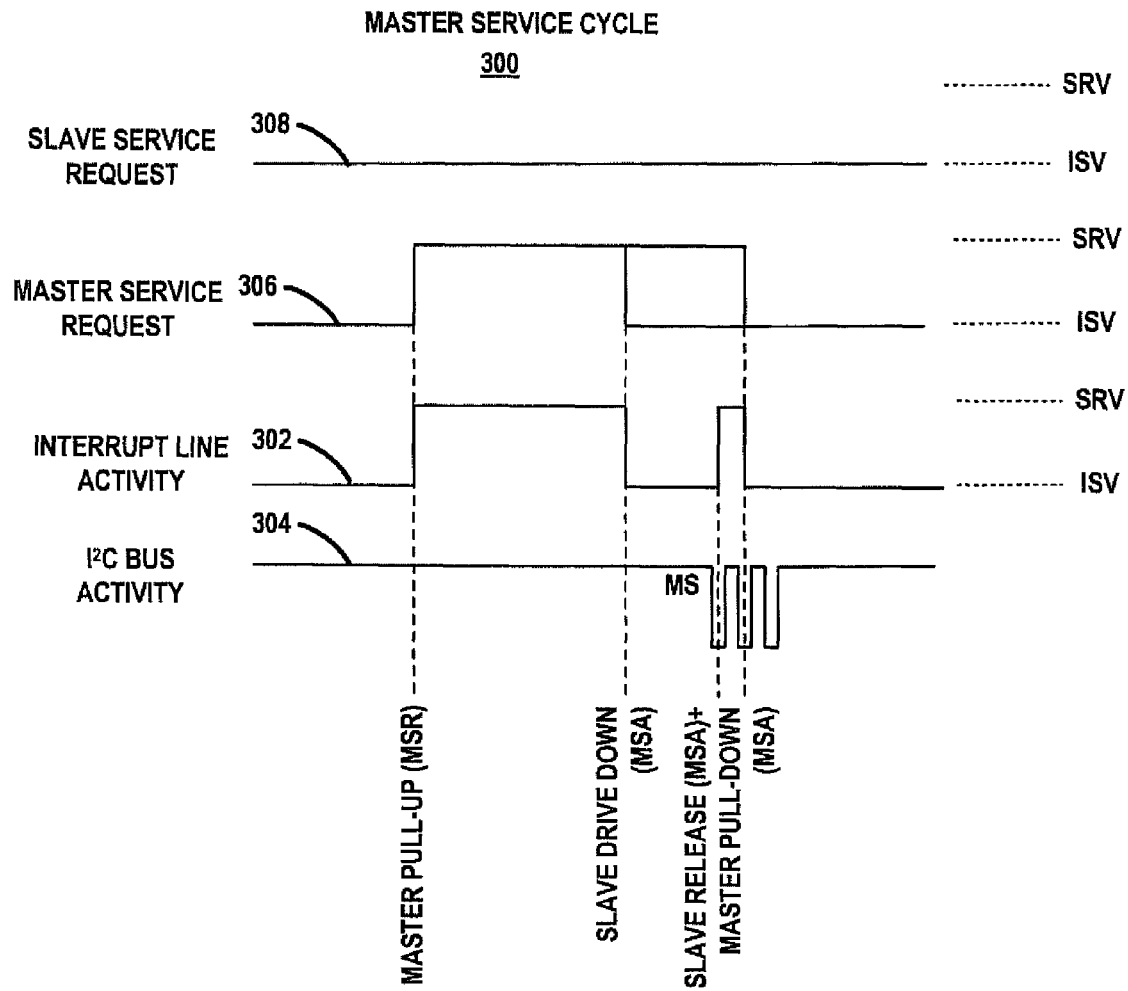
FIG. 3 is a timing diagram of the interrupt line voltage, bus voltage, master service request signal and the slave service request signal during an exemplary master service cycle.

FIG. 3 is a timing diagram of the interrupt line voltage 302, bus voltage 304, master service request signal 306 and the slave service request signal 308 during an exemplary master service cycle 300. The slave request signal 308 and the master service request signal 306 represent logical states for the requests and depending on the state of the slave interrupt interface 112 and the master interrupt interface 110, is not necessarily the actual voltage on the interrupt line 102 at the master processor or the slave processor. For example, if the master service request signal is logic high and the slave interrupt interface 112 is set to pull the interrupt line voltage down to logic low, the interrupt line voltage will be at logic low. For the master service cycle 300, the slave service request signal remains at the idle state voltage. The slave interrupt interface is maintained at a released state when the master service request signal is set to high. In the released state the GPIO driver 216 is set to an open circuit. At the beginning of the master service cycle, therefore, the GPIO ports of the slave interrupt interface are in an off or a high impedance state. The logic high is detected by the slave communication controller 120 through the GPIO buffer 218. After the slave communications controller 120 sets the slave bus interface 116 and any other related software and/or hardware of the slave processor 106 to a ready-to-receive state, the slave communications controller sets the driver 216 to a logic low value. The low voltage overrides the pull-up resistor 204 of the master interrupt interface 110 and sets the line interface voltage to a logic low. The master communications controller 118 detects the voltage transition to the low voltage through the buffer 212 in the master interrupt interface 110. The master communications controller 118 initiates the master service communication on the communications bus through the master bus interface 114. During communication on the communications bus 108, the pull-up switch 208 is deactivated and the pull-down switch 210 is activated to pull-down the voltage on the interrupt line 102, Also, the driver 216 is set to the open state to release the interrupt line 102 and allow the interrupt line to remain in the idle state during the communication session on the communications bus 108.

Figure 4:
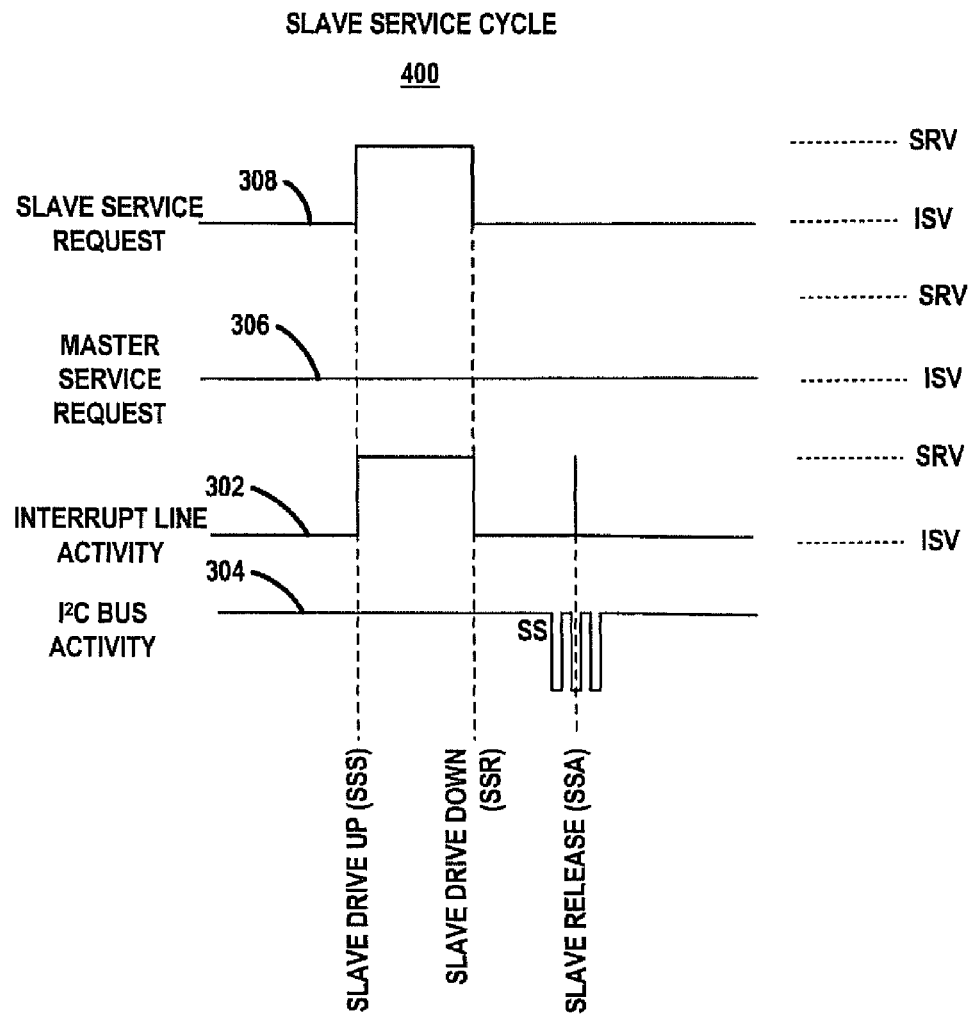
FIG. 4 is a timing diagram of the interrupt line voltage, bus voltage, master service request signal and the slave service request signal during an exemplary slave service cycle.

FIG. 4 is a timing diagram of the line interrupt voltage 302, bus voltage 304, master service request signal 306 and the slave service request signal 308 during an exemplary slave service cycle 400. During the slave service cycle 400 example of FIG. 4, the master service request signal 306 remains in the idle state at a logic low. After the driver 216 is set to a logic high by the slave communications controller 120, the slave communications controller 120 sets the slave bus interface 116 and any other related software and/or hardware of the slave processor 106 to a ready-to-receive state at which time the slave communications controller sets the driver 216 to a logic low value. The interrupt line voltage, therefore, is set to the service request voltage of a logic high overriding the pull-down resistor 206 of the master interrupt interface 110 and then to the idle state voltage of a logic low. The master communication controller 118 detects the high to low change in interrupt line voltage through the buffer 212 and performs the slave-to-master transaction by communicating on the communication bus 108.

Figure 5:
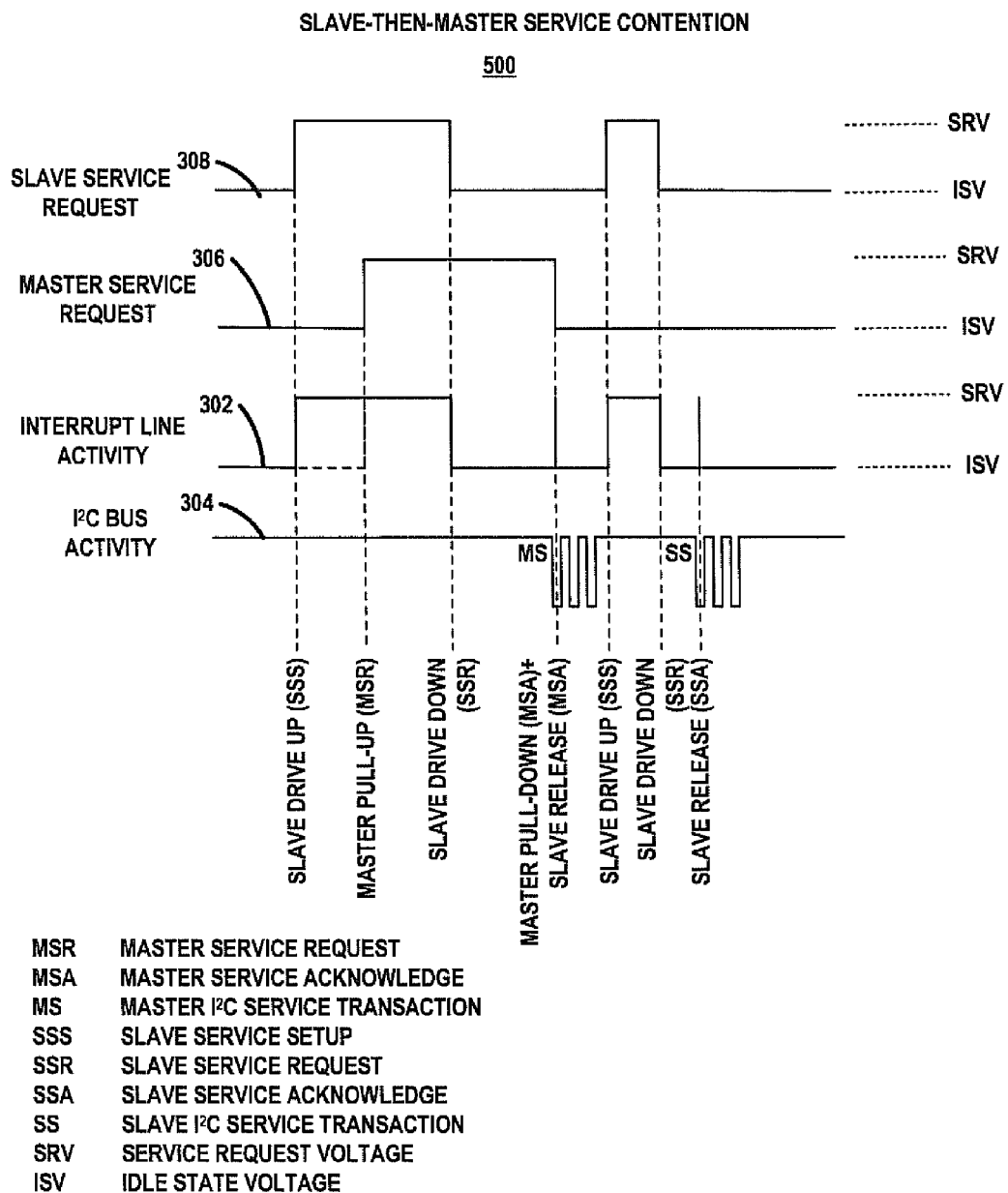
FIG. 5 is a timing diagram of the interrupt line voltage, bus voltage, master service request signal, and the slave service request signal during an exemplary slave-then-master service contention cycle where the slave processor initiates a service request prior to the master processor initiating a master service request.

FIG. 5 is a timing diagram of the line interrupt voltage 302, bus voltage 304, master service request signal 306 and the slave service request signal 308 during an exemplary slave-then-master service contention cycle 500 where the slave processor 106 initiates a service request prior to the master processor 102 initiating a master service request 300. For the example of FIG. 5, the slave communications controller 120 of the slave processor 106 attempts a slave service 400 request by setting the driver 216 to output the service request voltage. As discussed above, the service request voltage is a logic high voltage for the examples of FIGS. 3-6. Before the slave communications controller 120 can complete the service request by driving the voltage to the idle state, the master communications controller 118 of the master processor 102 controls the pull-up resistor switch 208 to drive the output of the master interrupt interface to the service request voltage. Subsequently, the slave communications controller instructs the driver to set the interrupt line voltage to the idle state voltage which is logic low. The driver sets the voltage low overriding the pull-up resistor 204 of the master interrupt interface 110. The master communications controller 118 detects the voltage transmission through the GPIO buffer 212 and interprets the transmission as a request acknowledgement from the slave processor 106. The master communications controller 120 initiates communications on the communication bus 108. The slave communications controller 120 detects the communications on the communication bus 108 and services the request. The interrupt line voltage is set to the idle state during the communication on the communication bus. The master communication controller sets the interrupt line voltage to the logic low by activating the pull-down resistor switch and the slave communications controller sets the GPIO port to a high impedance to allow the interrupt line voltage to remain in the idle state during the communication bus communication.

After the master service cycle is complete, the slave communication controller determines from the bus 108 data stream that the last transaction was a master request and initiates a repeated slave service request by setting the voltage to the service request voltage (logic high) and back to the idle state voltage through the driver.

Figure 6:
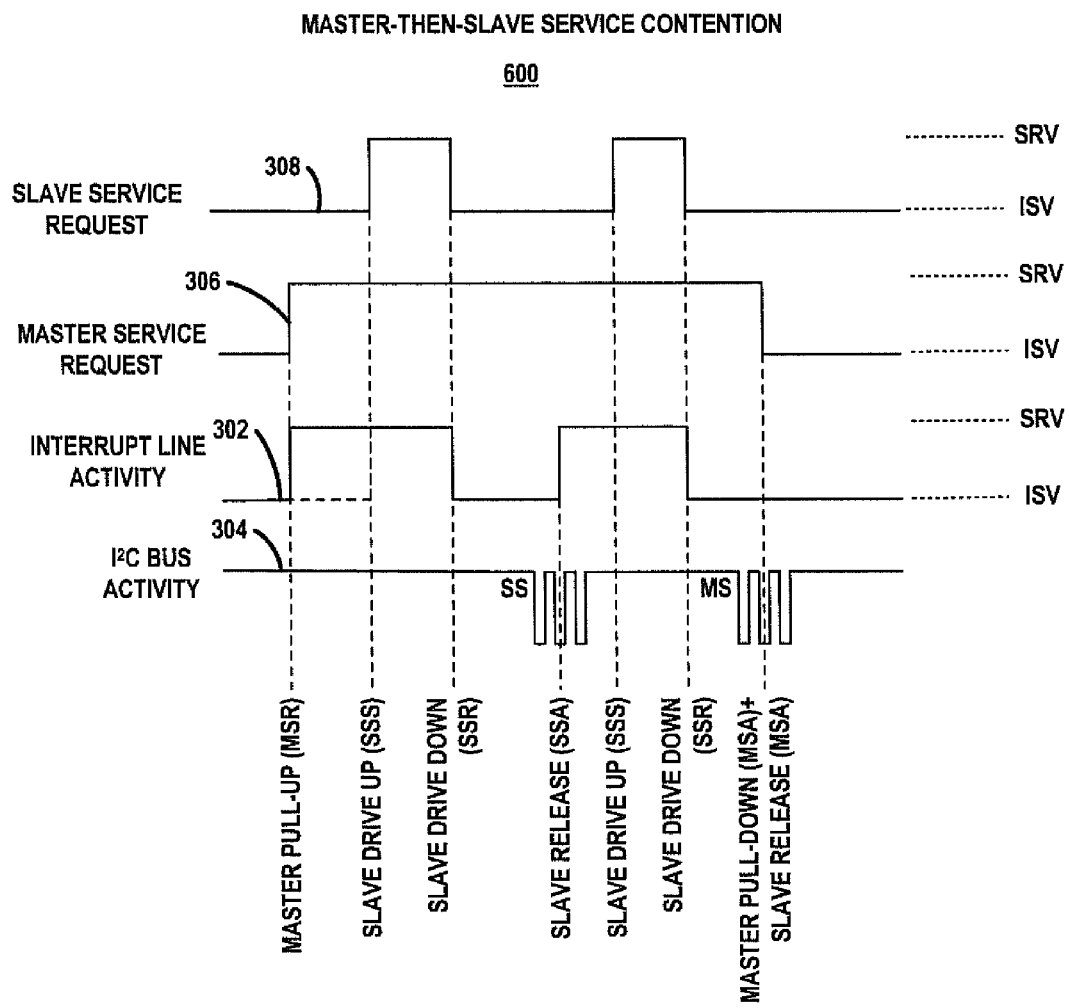
FIG. 6 is a timing diagram of the interrupt line voltage, bus voltage, master service request signal and the slave service request signal during an exemplary master-then-slave service contention cycle where the master processor initiates a master service request prior to the slave processor initiating a slave service request.

FIG. 6 is a timing diagram of the line interrupt voltage 302, bus voltage 304, master service request signal 306 and the slave service request signal 308 during an exemplary master-then-slave service contention cycle 600 where the master processor 102 initiates a master service request 300 prior to the slave processor 106 initiating a slave service request 400. For the example of FIG. 6, the master communications controller 118 initiates an attempted master service request by activating the pull-up resistor switch 208 to set the interrupt line voltage to the service request voltage of logic high. The slave communications controller toggles the output of the slave interrupt interface to the service request voltage and back to the low logic idle state voltage overriding the pull-up resistor of the master interrupt interface. The master communications controller 120 initiates communications on the communication bus 108. The slave communications controller 120 detects the communications on the communication bus 108 and services the slave request. Before the end of the transaction the slave communications controller sets the GPIO port to a high impedance to allow the interrupt line voltage to return to the request state being maintained by the master keeping the pull-up resistor switch activated in the master request state. After the slave processor acknowledges the request by forcing the interrupt line voltage to the idle state voltage of logic low, the master communications controller initiates the master service cycle on the bus 108.

Figure 7:
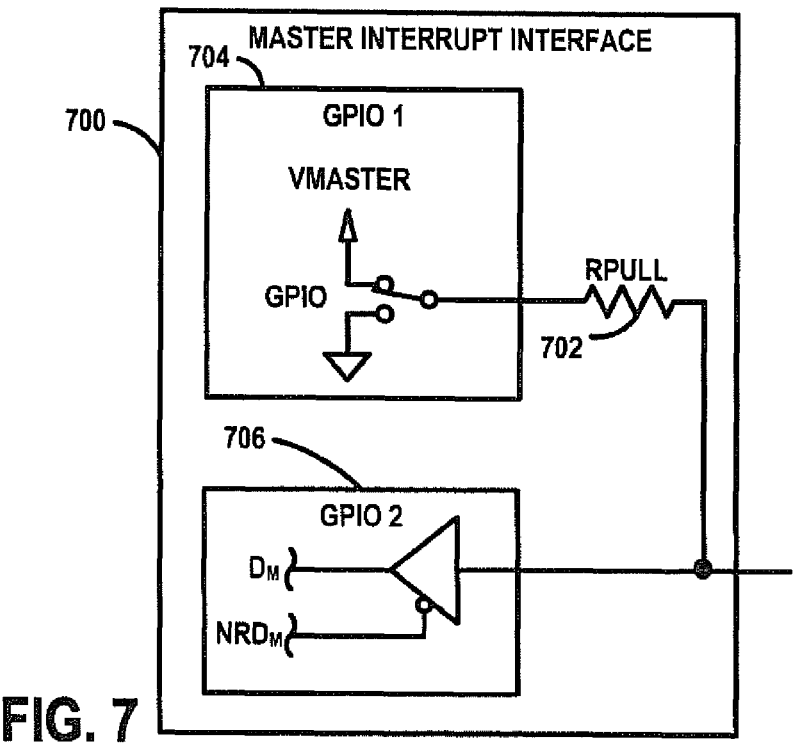
FIG. 7 is a block diagram of an exemplary master interrupt interface including a single resistor and two GPIO ports.

FIG. 7 is a block diagram of an exemplary master interrupt interface including a single resistor 702 and two GPIO ports 704, 706. The master interrupt interface 700 may be used in situations where internal resistors and/or switches are not available. A single pull resistor 702, which may be an external resistor, is used as a pull-up resistor and a pull-down resistor. When the first GPIO port 704 is switched to a logic high output, the pull resistor 702 acts as a pull-up resistor. When the first GPIO port 704 is set to a logic low, the pull resistor 702 acts as pull-down resistor. The second GPIO port 706 is used as a buffer to detect voltage changes on the interrupt line bus.

Figure 8:
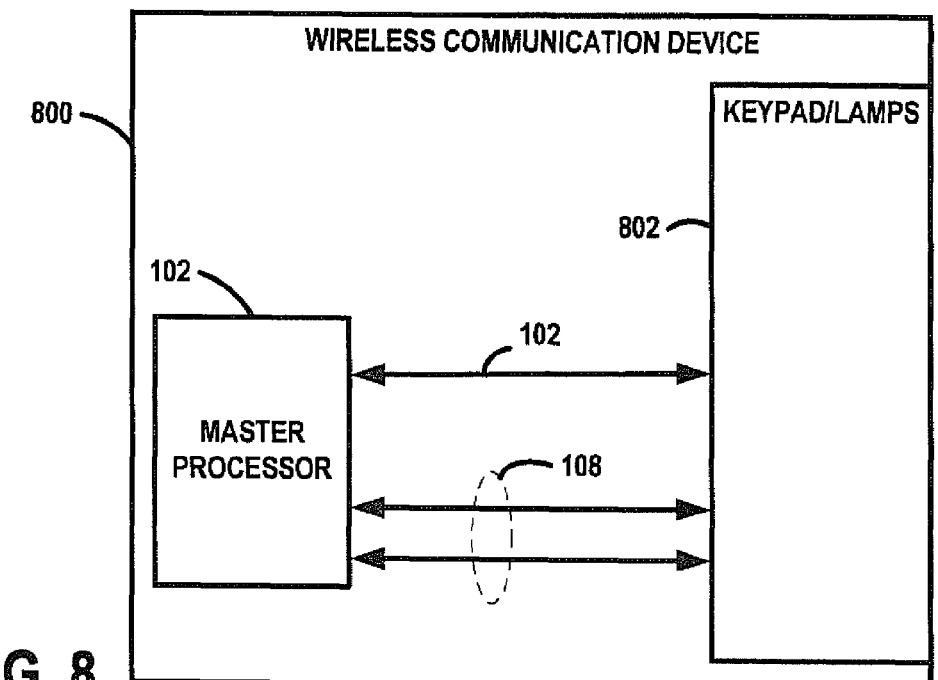
FIG. 8 is block diagram of a wireless communication device illustrating an example of suitable use for the bus communication system.

FIG. 8 is block diagram of a wireless communication device 800 illustrating an example of suitable use for the bus communication system 100. Although the single bi-directional interrupt line can be used with other buses within other types of devices, the interrupt line is used with an I²C bus to facilitate communications between an input/output device 802, such a keypad/lamp device, and the main processor of a wireless communication device 800. The wireless communication device 800 may be a cellular telephone, personal digital assistant (PDA), wireless modem, or other such device. A typical implementation of the communication bus 108 and the interrupt line 102 in such an embodiment includes using a ribbon cable or connect pins. In the interest of clarity and brevity the connections and pull-up resistors required for the I²C bus are not shown. The teachings herein can be applied to communication buses other than I²C bus systems Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A slave device comprising:
a slave interrupt interface for connecting to an interrupt line having an interrupt line voltage and connected to an idle state voltage through a resistor at a master device;
a two conductor slave communication interface for connecting to a two conductor communications bus connected to the master device; and
a communications controller configured to:
initiate communications through the two conductor communications bus with the master device by instructing the slave interrupt interface to set the interrupt line voltage from the idle state voltage to a service request voltage and subsequently to set the interrupt line voltage from the service request voltage to the idle state voltage; and
acknowledge, when adequate processor resources are available to process communications received on the two conductor communication bus, a master service request from the master device by instructing the slave interrupt interface to set the interrupt line voltage from the service request voltage to the idle state voltage.

2. The slave device of claim 1, wherein the idle state voltage is below an idle state voltage threshold and the service request voltage is above a service request voltage threshold.

3. The slave device of claim 2, wherein the slave interrupt interface is configured to receive the master service request by detecting the interrupt line voltage is greater than the service request voltage.

4. The slave device of claim 1, wherein the master service request is equal to the slave service request.

5. The slave device of claim 4, wherein the master service request and the slave service request are a logic high voltage and the idle state voltage is a logic low voltage.

6. A slave communications controller for controlling communications between a slave device and master device, the slave communications controller configured to
initiate communications through a two conductor communications bus with a master device by changing an interrupt line voltage of an interrupt line between the slave device and a master device from an idle state voltage to a service request voltage and subsequently from the service request voltage to the idle state voltage; and
acknowledge, when adequate processor resources are available to process communications received on the two conductor communication bus, a master service request from the master device by setting the interrupt line voltage from the master service request voltage to the idle state voltage.

7. The slave communications controller of claim 6, wherein the idle state voltage is below an idle state voltage threshold and the service request voltage is above a service request voltage threshold.

8. The slave communications controller of claim 7, further configured to receive the master service request by detecting the interrupt line voltage is greater than the service request voltage.

9. The slave communications controller of claim 6, wherein the master service request is equal to the slave service request.

10. The slave communications controller of claim 9, wherein the master service request and the slave service request are a logic high voltage and the idle state voltage is a logic low voltage.

11. A wireless communication device comprising:
a master processor comprising a master interrupt interface, a pull resistor, and a master communication bus interface; and
a slave processor comprising:
a slave interrupt interface connected to the master interrupt interface though an interrupt line having an interrupt line voltage and connected to an idle state voltage through the pull resistor;
a slave communication bus interface connected to the master communication bus interface through a bi-directional two conductor communication bus; and
a communications controller configured to:
initiate communications through the two conductor communications bus with the master device by instructing the slave interrupt interface to set the interrupt line voltage from the idle state voltage to a service request voltage and subsequently to set the interrupt line voltage from the service request voltage to the idle state voltage; and
acknowledge, when adequate processor resources are available to process communications received on the two conductor communication bus, a master service request from the master device by instructing the slave interrupt interface to set the interrupt line voltage from the service request voltage to the idle state voltage.

12. The wireless communication device of claim 11, wherein the idle state voltage is below an idle state voltage threshold and the service request voltage is above a service request voltage threshold.

13. The wireless communication device of claim 12, wherein the slave interrupt interface is configured to receive the master service request by detecting the interrupt line voltage is greater than the service request voltage.

14. The wireless communication device of claim 11, wherein the master service request is equal to the slave service request.

15. The wireless communication device of claim 14, wherein the master service request and the slave service request are a logic high voltage and the idle state voltage is a logic low voltage.

16. The wireless communication device claim 11, wherein the master processor is configured to connect the interrupt line to the master service request voltage through a pull-up resistor to send the master service request.

17. The wireless communication device of claim 16, further comprising a switch to connect the pull-up resistor to the service request voltage.

18. The wireless communication device of claim 16, further comprising a general purpose input/output (GPIO) port connected to the pull resistor, wherein the pull-up resistor is the pull resistor when the GPIO port is set to output the service request voltage.

19. A slave device comprising:
a slave interrupt interface for connecting to an interrupt line having an interrupt line voltage and connected to an idle state voltage through a resistor at a master device;
a two conductor slave communication interface for connecting to a two conductor communications bus connected to the master device; and
a communications controller configured to:
initiate communications through the two conductor communications bus with the master device by instructing the slave interrupt interface to set the interrupt line voltage from the idle state voltage to a service request voltage and subsequently to set the interrupt line voltage from the service request voltage to the idle state voltage; and
acknowledge a master service request from the master device by instructing the slave interrupt interface to set the interrupt line voltage from the service request voltage to the idle state voltage, wherein the idle state voltage is below an idle state voltage threshold and the service request voltage is above a service request voltage threshold.

20. The slave device of claim 19, wherein the slave interrupt interface is configured to receive the master service request by detecting the interrupt line voltage is greater than the service request voltage.

21. The slave device of claim 19, wherein the master service request is equal to the slave service request.

22. The slave device of claim 21, wherein the master service request and the slave service request are a logic high voltage and the idle state voltage is a logic low voltage.

23. A slave communications controller for controlling communications between a slave device and master device, the slave communications controller configured to
initiate communications through a two conductor communications bus with a master device by changing an interrupt line voltage of an interrupt line between the slave device and a master device from an idle state voltage to a service request voltage and subsequently from the service request voltage to the idle state voltage; and
acknowledge a master service request from the master device by setting the interrupt line voltage from the master service request voltage to the idle state voltage, wherein the idle state voltage is below an idle state voltage threshold and the service request voltage is above a service request voltage threshold.

24. The slave communications controller of claim 23, further configured to receive the master service request by detecting the interrupt line voltage is greater than the service request voltage.

25. The slave communications controller of claim 23, wherein the master service request is equal to the slave service request.

26. The slave communications controller of claim 25, wherein the master service request and the slave service request are a logic high voltage and the idle state voltage is a logic low voltage.

27. A wireless communication device comprising:
a master processor comprising a master interrupt interface, a pull resistor, and a master communication bus interface; and
a slave processor comprising:
a slave interrupt interface connected to the master interrupt interface though an interrupt line having an interrupt line voltage and connected to an idle state voltage through the pull resistor;
a slave communication bus interface connected to the master communication bus interface through a bi-directional two conductor communication bus; and
a communications controller configured to:
initiate communications through the two conductor communications bus with the master device by instructing the slave interrupt interface to set the interrupt line voltage from the idle state voltage to a service request voltage and subsequently to set the interrupt line voltage from the service request voltage to the idle state voltage; and acknowledge a master service request from the master device by instructing the slave interrupt interface to set the interrupt line voltage from the service request voltage to the idle state voltage, wherein the idle state voltage is below an idle state voltage threshold and the service request voltage is above a service request voltage threshold.

28. The wireless communication device of claim 27, wherein the slave interrupt interface is configured to receive the master service request by detecting the interrupt line voltage is greater than the service request voltage.

29. The wireless communication device of claim 27, wherein the master service request is equal to the slave service request.

30. The wireless communication device of claim 29, wherein the master service request and the slave service request are a logic high voltage and the idle state voltage is a logic low voltage.

31. The wireless communication device claim 27, further comprising a pull-up resistor and a switch to connect the pull-up resistor to the service request voltage, the master processor configured to connect the interrupt line to the master service request voltage through a pull-up resistor to send the master service request.

32. The wireless communication device of claim 31, further comprising a general purpose input/output (GPIO) port connected to the pull resistor, wherein the pull-up resistor is the pull resistor when the GPIO port is set to output the service request voltage.

33. A wireless communication device comprising:
a master processor comprising a master interrupt interface, a pull resistor, and a master communication bus interface; and
a slave processor comprising:
a slave interrupt interface connected to the master interrupt interface though an interrupt line having an interrupt line voltage and connected to an idle state voltage through the pull resistor;
a slave communication bus interface connected to the master communication bus interface through a bi-directional two conductor communication bus; and
a communications controller configured to:
initiate communications through the two conductor communications bus with the master device by instructing the slave interrupt interface to set the interrupt line voltage from the idle state voltage to a service request voltage and subsequently to set the interrupt line voltage from the service request voltage to the idle state voltage; and
acknowledge a master service request from the master device by instructing the slave interrupt interface to set the interrupt line voltage from the service request voltage to the idle state voltage; and
wherein the master processor is configured to connect the interrupt line to the master service request voltage through a pull-up resistor connected to the service request voltage through switch to send the master service request.

34. The wireless communication device of claim 33, further comprising a general purpose input/output (GPIO) port connected to the pull resistor, wherein the pull-up resistor is the pull resistor when the GPIO port is set to output the service request voltage.

* * * * *